United States Patent Office 3,783,043
Patented Jan. 1, 1974

3,783,043
TREATMENT OF HOT-ROLLED STEEL ROD
Francis Martin Almond, Rotherham, Edward Albert Shipley, Sprotborough, and Brian Wilfrid Cordon, Retford, England, assignors to The Templeborough Rolling Mills, Limited, Rotherham, Yorkshire, and British Ropes Limited, Doncaster, Yorkshire, England
Continuation-in-part of abandoned application Ser. No. 745,643, July 17, 1968. This application June 24, 1971, Ser. No. 156,223
Claims priority, application Great Britain, July 21, 1967, 33,712/67
Int. Cl. C21d 9/64, 9/52
U.S. Cl. 148—156     11 Claims

ABSTRACT OF THE DISCLOSURE

In the treatment of rod travelling at highspeed from a rolling mill and formed into non-concentric overlapping loops on a conveyor, the rod is not positively cooled before it is formed into the overlapping rings, and is allowed to cool naturally on the conveyor until it is only a little above the austenite transformation temperature, so that the austenite grains can grow to maximum size. When it is on the conveyor the rod is cooled by air at a rate of at least 700° C. per minute through the temperature range of 750 to 500° C., with the overall result that the precipitation of grain-boundary ferrite is minimized and finer and more uniform pearlite is produced.

---

This application is a continuation-in-part of application Ser. No. 745,643 filed July 17, 1968 by us for Treatment of Hot-rolled Steel Rod, now abandoned.

BACKGROUND OF THE INVENTION

In the production of steel rod which is to be subsequently drawn into wire, the usual practice is to roll a billet in a rod mill, and, while it is still travelling, cool the resultant rod and form it into a coil. In practically all modern rod mills the rod leaves the finishing stand at a temperature of about 1,000° C. and sometimes even 1,050° C., and at a speed of about 6,000 feet per minute or higher. Before the rod is coiled this temperature is almost invariably reduced by causing the rod to travel through a series of tubes traversed by water.

The rod can be drawn into wire satisfactorily, that is to say without fracture, or at least with a minimum of fractures or internal damage, only if it has a suitable metallurgical structure. The ideal structure consists of very fine pearlite with the minimum of grain-boundary ferrite, and this microstructure must be uniform throughout the cross section and along the length of the wire.

The treatment of the rod after it has been coiled depends in part on its gauge, in part on its composition, and in part on the extent to which it must be reduced in cross-sectional area during the drawing into wire. In many cases the heat treatment known as patenting must be applied, this comprising reheating the rod above the critical temperature at which the iron is transformed from alpha to gamma and the iron carbide is redissolved, and so cooling the rod that it passes quickly through the temperature range in which ferrite is rejected to the grain boundaries and in which coarse pearlite forms, but stays long enough in the range in which fine pearlite forms to ensure that the transformation is complete before the temperature falls below that at which bainite or other less ductile and undesirable phases form.

Rod of low-carbon steel can readily be drawn to wire without treatment except the removal of scale. Rod of large diameter, say as large as 9/16 inch, tends to be non-uniform in microstructure however it is cooled, and commonly is subjected to patenting before being drawn. Rod of small diameter and of medium to high carbon content can normally not be drawn to fine wire without patenting. Thus, as an example 5 S.W.G. rod, which is 0.218 inch in diameter, may have to be drawn down to 16 S.W.G., which is 0.064 inch in diameter, that is to say with a reduction in area of 91.4%. To enable this to be done consistently it has hitherto been necessary to patent the rod.

The reheating involved in the conventional patenting process adds substantially to the cost of the wire, and it is highly desirable to eliminate it.

To enable the invention and the manner in which it is distinguished from the prior art to be better understood, reference will be made to the annexed drawings, in which.

The inventive concept

Figure 1:
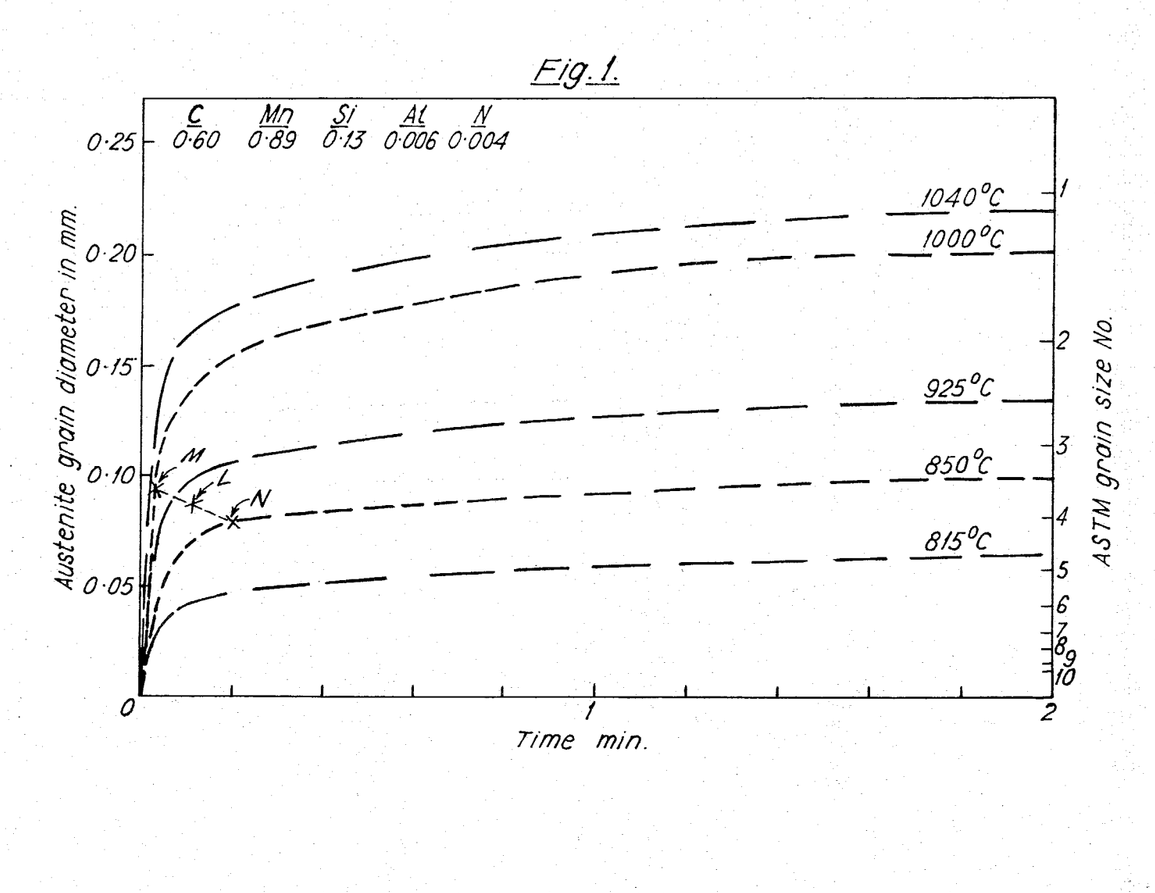
FIG. 1 is a graph in which the austenite grain size (mean diameter) is plotted against time at various temperatures, the grain size being given in mm. in the left-hand ordinates and in the A.S.T.M. size numbers in the right-hand ordinates.

Those skilled in the art know that the grains of austenite, which is the form in which steel exists during the hot-rolling of rods, increase in size when held at temperatures of 800° C. or higher, the rate of growth increasing with temperature and the size increasing with time at temperature. The growth of austenite grains in a steel of 0.6% C. at various temperatures and times up to 2 minutes is shown in FIG. 1.

Whereas a common view is that a small grain size is desirable, we aim at causing the grain size of the austenite which exists before the transformation to be as large as possible at the start of the transformation. Having produced a large austenite grain diameter, we forcibly cool the rod at an average rate of at least 700° C. per minute through the temperature range of 750 to 500° C.

The prior art

Numerous proposals have been made for controlling the cooling of the rod as it travels from the rod mill so as to produce the desired structure in it. None has been wholly successful.

With the exception of Pat. No. 3,276,920 to Sims, which will be discussed later, in what is now the substantial amount of literature on the subject of attempts to patent rod while it is still travelling from the mill, all the working directions are to cool the rod either in tubes or in some other way so as to reduce its temperature to about 815° C. or less prior to cooling it in controlled fashion so as to produce the desired microstructure in it.

One method of controlling the cooling of the rod comprises forming the rod into overlapping non-concentric rings on a conveyor and cooling it while it travels in this form. In order to produce these overlapping rings the rod must pass through a device which may be called a reeler. Hitherto the temperature of the rod while passing through the reeler has been 850° C. or below.

Specifically, in Pats. Nos. 3,231,432 to McLean et al. and 3,547,421 to Hoffman et al., processes are described in which the rod is reeled into such overlapping non-concentric rings on a conveyor in less than 1 second after leaving the final mill stand. Hoffman et al. teach water-cooling the rod as it travels to the reeler in order that it may be deposited on the conveyor at a temperature of from 50 to 100° C. above the conversion temperature, that is, at a temperature of about 800 to 850° C. FIG. 1 shows that the diameter of the austenite grain in a rod which reaches the reeler at a temperature of about 1000° C. is always appreciably larger than that of the same steel if it is cooled from about 1000° C. to about 815° C. within 1 second, as in the Hoffman et al. process. Hoffman et al. do indeed desire grain growth. They say that the wire, after being deposited upon the conveyor, is maintained above the austenite conversion temperature until the texture of the wire has reached a size of grain below or equal to 5 according to the A.S.T.M. standard. This is consistent with FIG. 1, from which it will be seen that at 815° C., being the average temperature for steels treated according to the Hoffman et al. invention, the wire must be held for about 40 seconds before the grain grows to A.S.T.M. No. 5. In other words a grain whose diameter is equal to 5 on the A.S.T.M. scale is the largest that can be expected by the Hoffman et al. process. To avoid excessive scale on holding for about 40 seconds, Hoffman et al. recommend effecting this holding in a non-oxidizing atmosphere, a feature which is unacceptable in practice, since it necessitates the provision of complicated apparatus.

In the process described by McLean et al., which is known by the name of Stelmor, the temperature of the rod while passing through the reeler is in the range below about 815° C. We have found that the microstructure of rod subjected to such controlled cooling is often not good enough to enable, for example, 5 S.W.G. rod to be drawn to 16 S.W.G. wire as in the example given above.

In the Sims process described in Pat. No. 3,276,920, cooling is omitted between the mill and a coiler and a different type of transformation takes place. Sims insists that the rod be cooled in the coil from 720° C. to 650° C. in under 4 seconds and that it be held in the range of 650 to 550° C. for from 10 to 30 seconds. It is clear that Sims intends to bring about an isothermal type of transformation similar to that occurring in lead bath patenting, rather than continuous cooling transformation. To achieve this result Sims has to use a fluidized bed of sand, thus considerably complicating this process and apparatus. In the type of transformation aimed at by Sims, grain size is not important in its influence on the desired metallurgical structure (minimum grain-boundary ferrite and fine pearlite).

Traditionally, slow cooling from, or holding at, high temperature has been avoided because it has been thought that the scale formation would be excessive. Attention has been drawn above to the complication Hoffman et al. introduce to avoid scale. McLean et al. say the scale produced in their process is not more than 1% by weight. We have found that, while maintaining the temperature high to ensure austenite grain growth, we can still keep the scale below this maximum of 1%.

The invention in detail

In the invention the rod is formed into overlapping non-concentric rings at a temperature at least as high as 950° C., but in complete contrast to the standard practice is not positively cooled before this is done. When the rod has been reeled and laid into the overlapping rings, it is carried forward by the conveyor. For at least 9 seconds, and preferably for about 12 seconds, from leaving the last mill stand the rod is kept at high temperature, that is to say it is allowed to cool naturally. This time at temperature ensures grain growth, being long enough to include the period of rapid growth. As FIG. 1 shows, the rate of further growth is so reduced that relatively long periods of holding at high temperature produce relatively little change in grain size. The 1000° C. curve in FIG. 1 of course does not show the grain growth in a rod treated according to the invention, since it is an isothermal curve, whereas in the invention the rod temperature may be allowed to fall to about 850° C. in the preferred time of about 12 seconds. However, the grain size at the end of the 12 seconds can be represented by the mid-point L between the point M showing the size when the rod is at 1000° C. about 1 second after leaving the last mill stand and the point N when the rod is at 850° C. about 11 seconds later. In practice the average diameter of the austenite grain is never smaller than that of A.S.T.M. No. 5 and is sometimes as large as A.S.T.M. No. 3.

Figure 2:
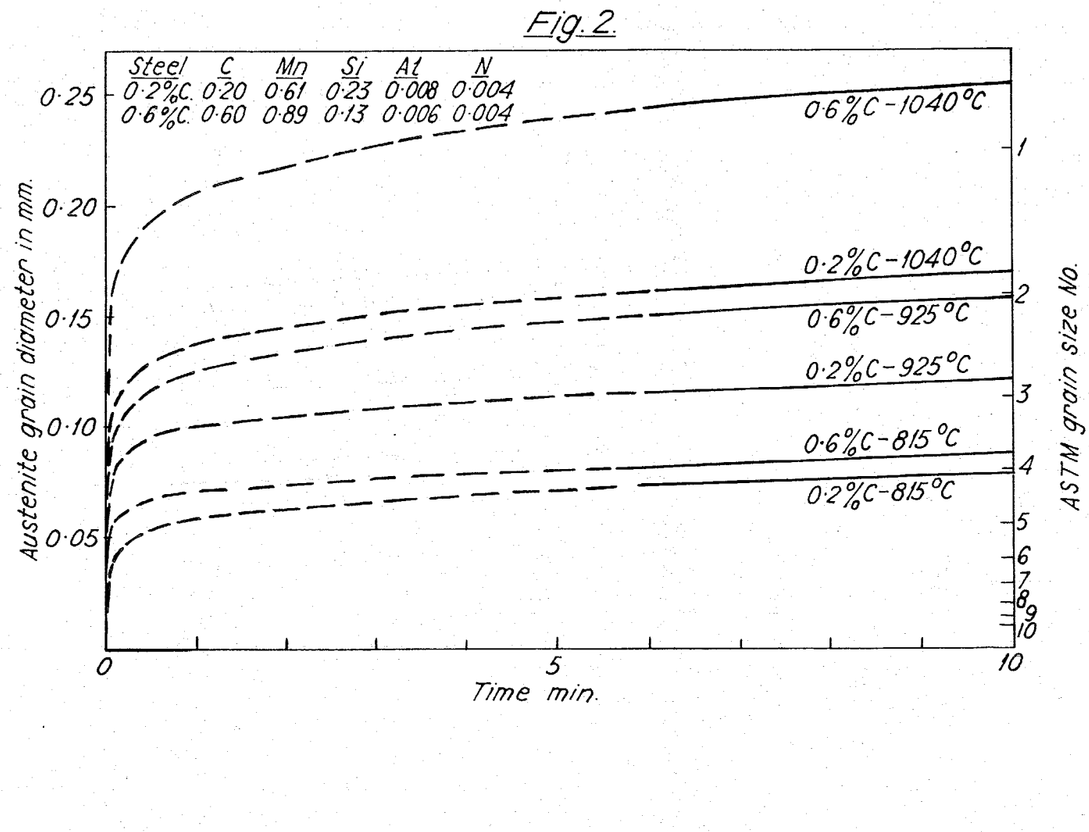
FIG. 2 is a similar graph relating to steels of different carbon contents.
Figure 3:
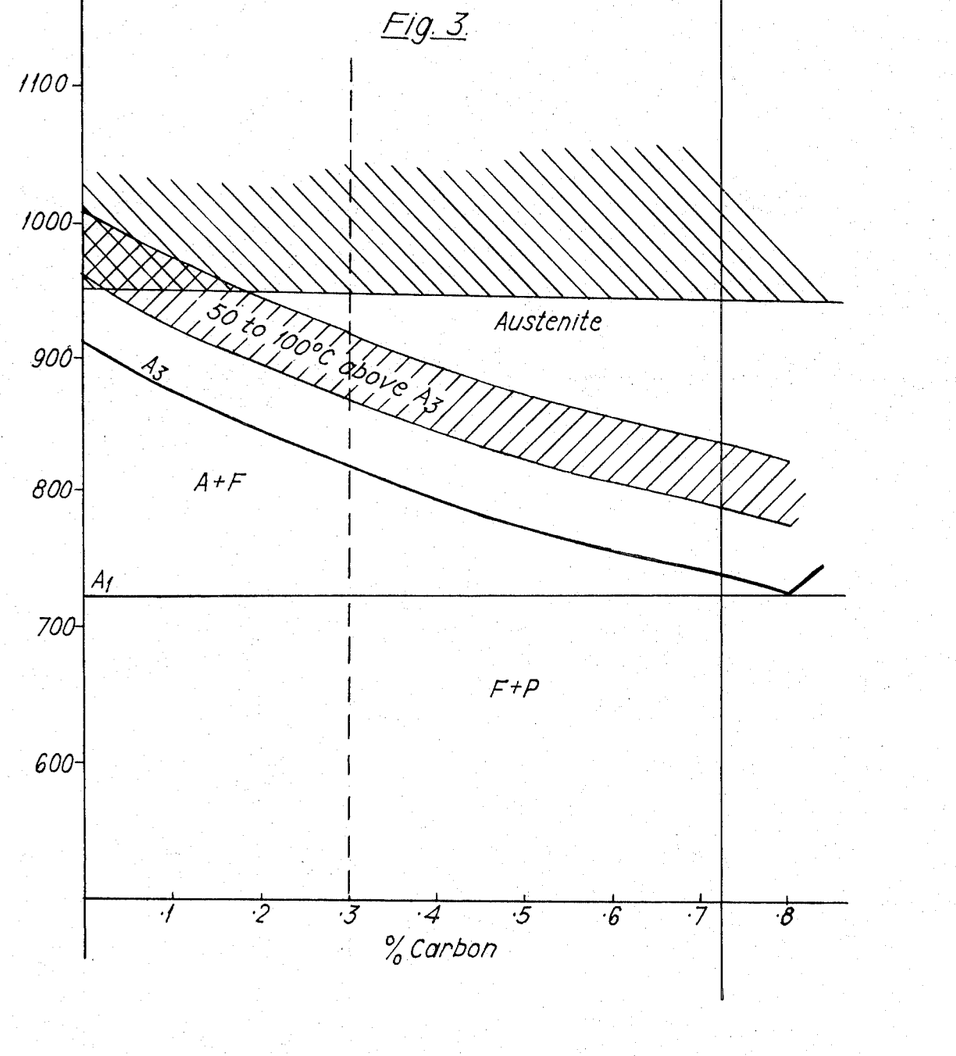
FIG. 3 is an equilibrium diagram.

The figures just given apply to the carbon steels as commonly produced for drawing into rod and wire. As is well known, these usually have carbon contents of from 0.20 to 1.0% and manganese contents of from 0.5 to 1.0% and of course their transformation points vary with the carbon contents, as do the rates of grain growth and the grain sizes attained. FIG. 2 is a graph similar to FIG. 1 but showing steels of two different carbon contents, namely 0.2% to 0.6% and is taken from Miller. Transactions of the A.S.M. 43, 1951, page 260. FIG. 3 shows how the holding of the rod at a temperature which is at least 950° C. when it is reeled in the invention is independent of the carbon content, whereas in the steels with 0.3% carbon or more described by Hoffman et al. the temperature range before reeling is much lower and therefore the rate of grain growth is less.

Steels made with additions of aluminium or vanadium to produce a fine-grained structure, which find little favour in wire manufacture, will not necessarily have grain sizes in the range of A.S.T.M. 5 to 3, but if the invention is applied to them they will nevertheless have a larger grain size before transformation than would otherwise be the case.

When the grain growth has taken place as described above, we cool the rod forcibly by applying to it a cooling medium which is preferably air but may be another gas or a liquid. The cooling must be so effected that the rod passes through the range of 750° to 500° C. at an average rate that is at least 700° C. per minute, but is not so rapid that bainite is formed.

Figure 4:
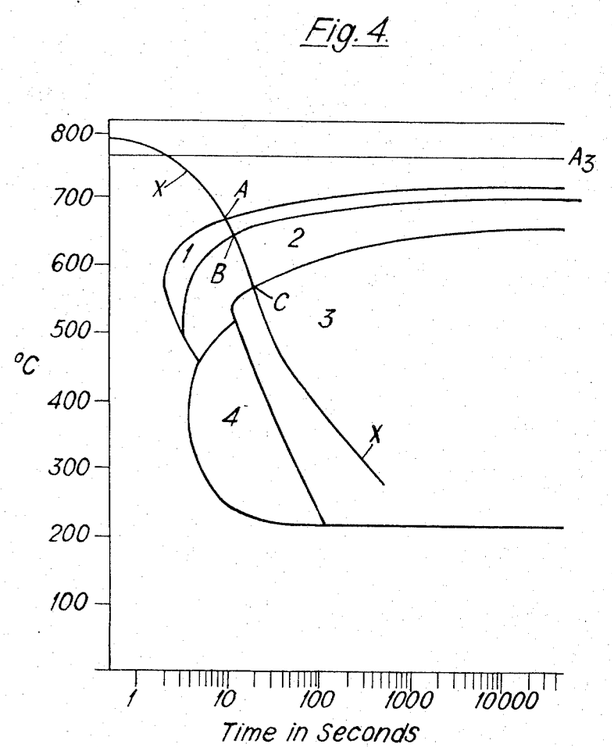
FIGS. 4 and 5 are continuous cooling T–T–T diagrams.
Figure 5:
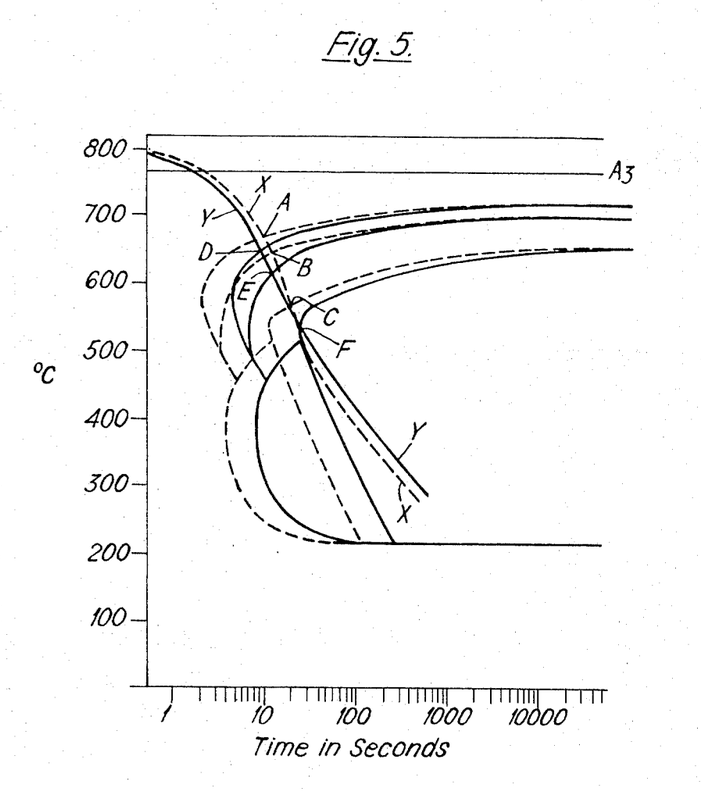

The advantage of the large grain size produced according to the invention will be better understood by consideration of FIGS. 4 and 5, which are continuous cooling T-T-T diagrams of the kind well known to metallurgists and which show the transformation behaviour of a typical medium carbon steel, say of 0.55% carbon content. FIG. 4 shows at X the cooling curve when the rod is water-cooled before reaching a reeler at about 815° C., so that the grain size of the austenite is small, and is then forcibly cooled by air while in the form of overlapping rings on a conveyor. The length A–B of the curve X passes through the Zone 1 in which ferrite is precipitated and the length B–C passes through the Zone 2 in which austenite is transformed to fine pearlite. When the Zone 3 is reached the microstructure is composed of pearlite and ferrite. The Zone 4 is that which contains some bainite and austenite. The temperatures of the points A, B and C are about 670, 640 and 560° C. respectively.

FIG. 5 shows in full lines the diagram and the cooling curve Y when the rod is cooled according to the invention, the diagram and curve X of FIG. 4 being also shown in dotted lines. Because of the grain growth that has occurred in the process according to the invention, the amount of ferrite deposited at the grain boundaries is reduced. Moreover, the transformation takes place more sluggishly, and therefore the curves of the T–T–T diagram are displaced towards the right of the diagram. The points in the curve Y corresponding to A, B and C in the curve X are marked D, E and F, the temperatures of these points being 640, 615 and 550° C. respectively. Thus in the process of the invention the ferrite is precipitated over the length D–E, and it will be seen that the average temperature in this length D–E is lower than that in A–B, with the result that the precipitation of ferrite at the grain boundaries proceeds proportionately less readily. Over the length E–F, in which austenite transforms to pearlite, the average temperature is lower, with the result that the pearlite formed is of greater average fineness; moreover, the pearlite is more uniform because the length E–F (the temperature range in which the transformation occurs) is shorter than the length B–C.

It is desirable that the average cooling rate through the temperature range of 750° to 500° C. should approximate to 800° C. per minute. It is much preferred that the rate of cooling in Zone 1, in which austenite rejects ferrite and could transform, if allowed to do so, to coarse pearlite, should be greater than that in Zone 2, in which fine pearlite is formed. In Zone 1 the rate is preferably at least 1000° C. per minute, in order that the amount of grain-boundary ferrite formed may be as low as possible.

FIGS. 4 and 5 relate to a typical hypo-eutectoid steel. As indicated above, the invention is not restricted either to hypo-eutectoid steel or to plain carbon steel. As is well known, a T–T–T diagram can be drawn for steels of all carbon contents. The T–T–T curves are all of the same basic character, but their shapes and positions on the diagram vary with the carbon content. The nature of the effect produced by change of grain size is the same whatever the carbon content, but the magnitude of the effect varies with the composition of the steel. If the steel is of eutectoid composition there is, of course, no rejection of ferrite. If it is of hypereutectoid composition, cementite is rejected before pearlite forms. With such steels the rate of cooling should again be faster through the cementite range than during the pearlite range. An example of such a steel to which the invention has successfully been applied is steel containing 1% carbon and 1.5% chromium (BSS En31).

In general the temperature ranges of the transformation and the most suitable cooling rate through any given temperature range can readily be determined from the T–T–T diagram applicable to the steel in question when the rod has not been forcibly cooled before being reeled.

In modern high-speed rod mills, long distances between the final rolling stand and the reeler are undesirable and to be avoided due to the risk of cobbling. The reeler is commonly situated between 50 and 100 ft. from the final stand. In carrying out the invention under these conditions we reel at a temperature of about 1,000° C. without any applied cooling between the final stand and the reeler. When the rod has been reeled and formed into the non-concentric rings it is allowed to cool naturally as described above for at least 8 seconds on the conveyor. Thereafter, while the rod is at a temperature which is not critical except that it must be above that of the transformation of the austenite, the cooling medium, most conveniently air supplied by fans, is applied to the rings. Advantageously there may be several fans in line, the first one or two delivering air at a greater rate than the next one or two so as to make the speed of cooling during the range of transformation to ferrite greater than that during the range of transformation to pearlite.

Referring to FIGS. 6 to 9, the final rolling stand of a high-speed rod mill is shown at 1, and rod 2 rolled in the mill passes from this stand through guide tubes 3 to a reeler 4. Whereas in conventional practice the rod is water-cooled in passing through the tubes 3, in the present invention it is not positively cooled by water or otherwise, and reaches the reeler 4 within one second or thereabouts of leaving the mill stand 1. In consequence it is at a temperature of about 1,000° C. on reaching the reeler 4, which as shown is of the horizontal type in which the rod is formed into vertical rings which tip forwards about their lower edges as shown at 5, to fall onto a conveyor 6 in the form of overlapping rings 7. It is on this conveyor that the rings are subsequently cooled by the application of air, and this cooling air should have free access to all parts of the moving rod. It is therefore desirable that the rod should not be in static contact with a conveyor, and that contact between any part of the rod and any part of the conveyor should be momentary. A roller conveyor most closely satisfies this requirement and is therefore preferred. The conveyor 6 is, in fact, such a conveyor, but it will be understood that other types of conveyor are not excluded.

In addition it is advantageous to bring about relative movement of the rings while they are being cooled, and this may be done by tapering the ends of some of the rollers so that the diameter of each such roller decreases from the end inwardly over that part of the roller which is engaged by overlapping sides of the rings.

Figure 9:
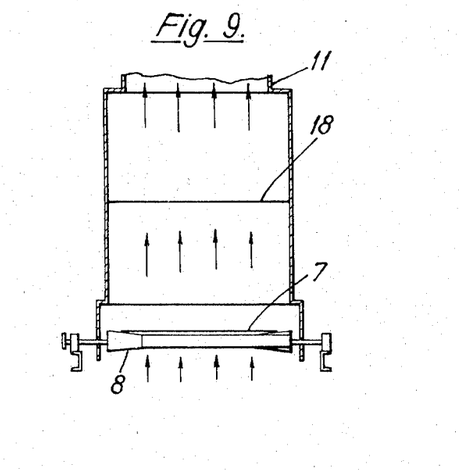

FIG. 9 shows one roller of the conveyor 6 with tapered ends 9.

After about 12 or 13 seconds have elapsed from the reeling, the rings on the conveyor enter a tunnel 9 which is completely open at the bottom, and from the top of which four ducts 10, 11, 12 and 13 lead to fans 14, 15, 16 and 17 respectively. The lower part of the tunnel is internally divided by transverse partitions 18 so that air drawn upwards by the fans is guided in the manner shown by arrows in FIGS. 8 and 9. In addition transverse partitions 19 in the tunnel divide it effectively into four lengths, each connected to one of the fans. It will be seen that the air flow is substantially uniform over the width of the mat of rings on the conveyor.

It is also possible to blow air from the bottom of the conveyor upwardly, in which case the top of the tunnel will be open.

Figure 6:
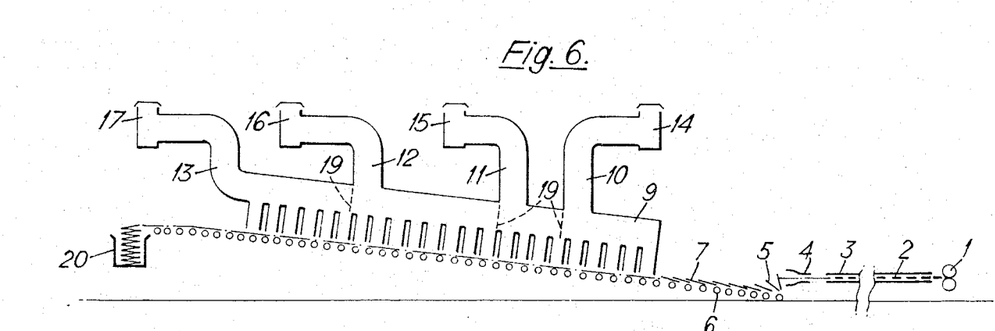
FIGS. 6 to 9 of the drawings show diagrammatically a typical plant in which the invention can be carried out, FIG. 6 being an elevation and FIG. 7 a plan of the plant, FIG. 8 showing part of the elevation on a larger scale, and FIG. 9 being a section on the line IX—IX in FIG. 8 on a still larger scale.
Figure 7:
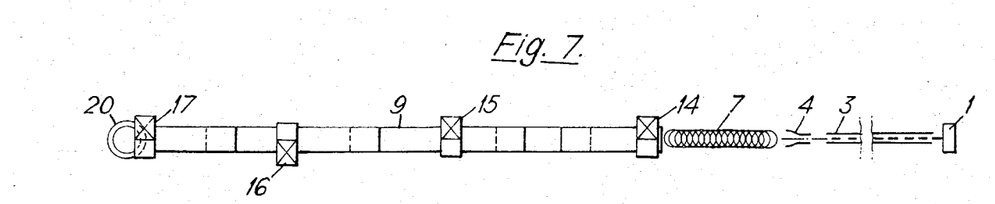
Figure 8:
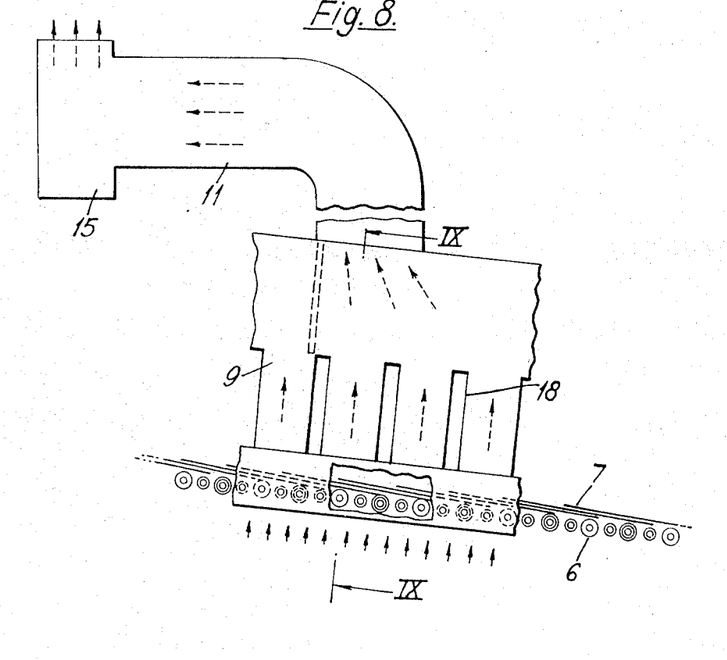

From the conveyor 6 the rings are delivered into a conventional coiling device 12, from which the coils are removed in succession to be drawn into wire.

The normal diameter of the rings 7 is from 44 to 48 inches. The distance between the centres of adjacent rings depends upon the relative speeds of the rod (when it reaches the reeler) and the conveyor. It is, of course, obvious that the more closely spaced are the rings, the greater will be the overlap of metal at the two sides of the travelling mat of rings 7. Hitherto the usual spacing has been 2 inches between centres, with the result that at numerous points along the mat there has been a ring in contact with one above and another below, the mat at these points being thus three rings high, and even at some points four rings high. This local accumulation of metal has caused the cooling to be uneven unless special precautions were taken, as in the McLean et al process, to apply more air to the edges than to the center of the mat, and even then uniform cooling was difficult to obtain.

We have found that such differential application of air is unnecessary if the spacing between the rings is increased, particularly if relative movement of the rings is brought about by tapering the ends of some of the conveyor rollers or otherwise. We aim at ensuring that the mat is as far as possible only two rings high and never more than three rings high at any point. To achieve this result with rings 44 inches in diameter we run the conveyor at a speed such that the average spacing between the centers of adjacent rings is at least 2½ inches, preferably at least 3 inches, and (if the length of the conveyor will permit) 4 inches or more.

As an example, rod 0.218 inch in diameter of 0.55% carbon steel, travelling at 100 feet per second or faster, is formed into overlapping non-concentric rings about 44 inches in diameter which travel on the conveyor 6 at a speed such that the spacing of the individual rings is not less than 2.5 inches. The fans 14, 15, 16 and 17 are located respectively at 30, 40, 60 and 75 feet from the reeler, the first two fans 14 and 15 each drawing air at about 830 cubic feet per second, and the second two 16 and 17 each drawing air at about 500 cubic feet per second.

The distance between the reeler and the entrance to the tunnel should be such that forced cooling is not applied until the rod temperature has fallen to 850–800° C., i.e. above, but not more than 50° C. above, $Ar_3$. This ensures that grain growth is allowed to proceed for as long as possible before commencing rapid cooling. It is even desirable, in certain circumstances, to extend this grain growth period by insulation to prevent cooling too rapidly by natural radiation and convection, but it must be accepted that this will result in a greater weight of scale, unless special precautions are taken, such as providing a protective atmosphere. In the typical installation quoted above, the rod, though reaching the reeler is about 1½ seconds, will not reach the first fan 14 until about 12 seconds later. Accordingly grain growth is occurring for about 13 seconds, while the temperature falls to about 850° C. before there is positive cooling of the rings by the air drawn over them by the fans.

The cooling effected by the first two fans is rapid, with the result that the rod passes rapidly through the temperature range of 720 to 615° C. The next two fans, 10 and 11, apply less air so the rate of cooling is lower and there is opportunity for fine pearlite to form.

It is not essential that there should be four fans, or that two of them should apply air at one rate and two at another. But however many fans are used and wherever they are situated, it is an important feature of the invention that, when treating medium and high plain carbon steel, there should be at least one large fan situated so that it is cooling the rod at a rate of not less than 1000° C. per minute through the temperature range wherein ferrite is precipitated, wherever this range may be on the conveyor.

Other fan or fans must also be provided such that they are capable, in combination with the large fan just described, for producing in these steels, an overall cooling rate, through the whole transformation range, of at least 700° C. and preferably about 800° C. per minute.

In comparison with processes in which the rod is cooled to about 815° C. before being reeled and is then subjected to controlled cooling, the process of the invention gives the very considerable advantage of consistently good tensile properties and drawability. Rods of this nature are regularly drawn to 15 and 16 S.W.G. a total reduction of 89% and 91.4% respectively, and with excellent uniformity of properties over the length of a coil.

As one illustration of the improved results, rods from a single cast of steel containing 0.52% carbon were reeled at different temperatures. Seven coils were reeled at 1025° C. and seven more coils at from 850 to 875° C., being water-cooled on their way to the reeler. All the rods were of 5 gauge, and without preliminary heat treatment were drawn to 15 gauge. Table 1 below shows the reeling temperature and conveyor speed of each batch, the number of coils in each batch of seven which had breaks, and the total number of breaks in each batch.

TABLE 1

| Batch Number | Reeling temp., °C. | Conveyor speed, ft./min. | Wire drawing speed ft./min. | Number of coils with breaks | Total number of breaks |
|---|---|---|---|---|---|
| 1 | 1,025 | 55 | 1,100 | None | None |
| 2 | 850/875 | 67 | 900 | 4 | 20 |

It will be seen that the drawing speed of Batch 1 was greater than that of Batch 2, and yet there were no breaks.

Figure 10:
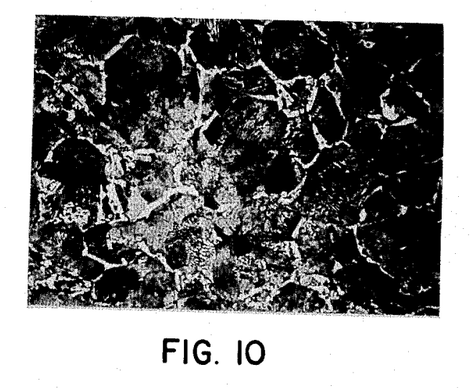
FIG. 10 is a photomicrograph showing the microstructure of a rod rolled according to the invention.
Figure 11:
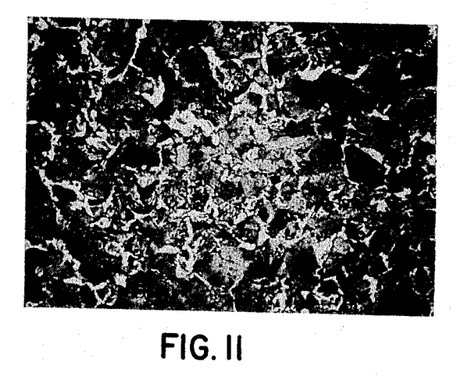
FIG. 11 is a similar photomicrograph of a rod of the same composition rolled according to the prior art.

FIG. 10 shows the microstructure of a rod in Batch 1, and FIG. 11 that of a rod in Batch 2. In these photomicrographs the white areas are ferrite which has precipitated at the grain boundaries of the austenite, and the remaining areas are pearlite, some of which is lamellar and some of which is unresolved. The average grain diameter of the specimen reeled at 1025° C. (FIG. 10), which is an indication of the prior austenite grain size, is considerably larger than that of the specimen reeled at the lower temperature (FIG. 11). In fact, the average austenite grain diameter which led to FIG. 10 was equivalent to A.S.T.M. 5 and that which led to FIG. 11 was equivalent to A.S.T.M. 7.

The improved results are also shown by the results of some tests on rods produced from three separate casts of steel, each of which was over 10 tons and produced more than 40 rods, each nominally 600 lbs. in weight. Of the rods from each cast, three were selected at random, and from the rod coils so selected six full rings were cut from various random parts of each coil. Each ring was cut into 12 continuous test pieces each about 9 inches long, which were then subjected to a tensile test. All the rods were of 5 S.W.G. (0.218 inch diameter).

The tables below show the maximum and minimum tensile strengths found in the twelve test pieces from each ring; the spread, that is the difference between the maximum and the minimum; the average of the twelve results obtained for each ring; and the corresponding figures for the six rings cut from each coil.

The analyses of the three casts were as follows:

| Cast Number | C | Si | S | P | Mn | Ni | Cr | Sn | Cu | Mo |
|---|---|---|---|---|---|---|---|---|---|---|
| 1 | .51 | .23 | .033 | .010 | .55 | .10 | .03 | .013 | .10 | .01 |
| 2 | .68 | .19 | .030 | .010 | .53 | .09 | .05 | .010 | .07 | .01 |
| 3 | .83 | .24 | .036 | .013 | .71 | .07 | .02 | .007 | .07 | .01 |

TABLE 2

Cast No. 1 (0.51% C)

Tons. f. in.$^{-2}$

| Coil | Ring | Max. | Min. | Spread | Average | Summary |
|---|---|---|---|---|---|---|
| 1 | 1 | 53.9 | 51.6 | 2.3 | 53.1 | Coil avg.=53.2. |
|   | 2 | 54.2 | 51.6 | 2.6 | 53.3 | Max.=54.5. |
|   | 3 | 54.5 | 51.6 | 2.9 | 53.4 | Min.=51.1. |
|   | 4 | 54.2 | 51.1 | 3.1 | 53.3 | Spread=3.4. |
|   | 5 | 54.2 | 51.6 | 2.6 | 53.1 | |
|   | 6 | 54.2 | 51.4 | 2.8 | 53.2 | |
| 2 | 1 | 53.7 | 50.9 | 2.8 | 52.7 | Coil avg.=53.3. |
|   | 2 | 54.5 | 52.2 | 2.3 | 53.4 | Max.=54.8. |
|   | 3 | 54.8 | 52.2 | 2.6 | 53.7 | Min.=50.9. |
|   | 4 | 54.8 | 52.2 | 2.6 | 53.7 | Spread=3.9. |
|   | 5 | 54.5 | 51.4 | 3.1 | 53.0 | |
|   | 6 | 54.4 | 52.3 | 2.1 | 53.0 | |
| 3 | 1 | 55.5 | 52.4 | 3.1 | 54.0 | Coil avg.=54.3. |
|   | 2 | 55.5 | 52.4 | 3.1 | 54.3 | Max.=56.0. |
|   | 3 | 56.0 | 52.7 | 3.3 | 54.6 | Min.=51.9. |
|   | 4 | 55.5 | 52.7 | 2.8 | 54.6 | Spread=4.1. |
|   | 5 | 55.5 | 52.3 | 3.2 | 54.6 | |
|   | 6 | 55.3 | 51.9 | 3.4 | 54.0 | |

TABLE 3

Cast No. 2 (0.68% C)

Tons. f. in.$^{-2}$

| Coil | Ring | Max. | Min. | Spread | Average | Summary |
|---|---|---|---|---|---|---|
| 1 | 1 | 65.4 | 61.9 | 3.5 | 64.2 | Coil avg.=64.5. |
|   | 2 | 65.8 | 62.0 | 3.8 | 64.3 | Max.=65.9. |
|   | 3 | 65.9 | 63.5 | 2.4 | 64.8 | Min.=61.9. |
|   | 4 | 65.5 | 62.0 | 2.3 | 64.6 | Spread=4.0. |
|   | 5 | 65.9 | 62.1 | 3.8 | 64.8 | |
|   | 6 | 65.7 | 62.7 | 3.0 | 64.4 | |
| 2 | 1 | 65.0 | 62.8 | 2.2 | 64.1 | Coil avg.=64.5. |
|   | 2 | 65.5 | 62.1 | 3.4 | 64.4 | Max.=65.8. |
|   | 3 | 65.6 | 63.5 | 2.1 | 64.6 | Min.=62.1. |
|   | 4 | 65.6 | 62.6 | 3.0 | 64.4 | Spread=3.7. |
|   | 5 | 65.8 | 63.5 | 2.3 | 64.7 | |
|   | 6 | 65.6 | 62.4 | 3.2 | 64.5 | |
| 3 | 1 | 65.7 | 63.3 | 2.4 | 64.8 | Coil avg.=64.6. |
|   | 2 | 65.4 | 62.1 | 3.3 | 64.2 | Max.=66.0. |
|   | 3 | 65.6 | 62.9 | 2.7 | 64.6 | Min.=62.1. |
|   | 4 | 65.5 | 63.4 | 2.1 | 64.7 | Spread=3.9. |
|   | 5 | 65.9 | 62.4 | 3.5 | 64.6 | |
|   | 6 | 66.0 | 63.3 | 2.7 | 64.9 | |

TABLE 4

Cast No. 3 (0.83% C)

| Coil | Ring | Max. | Min. | Spread | Average | Summary |
|---|---|---|---|---|---|---|
| | | Tons. f. in.$^{-2}$ | | | | |
| 1 | 1 | 77.0 | 74.3 | 2.7 | 75.5 | |
| | 2 | 77.2 | 72.9 | 4.3 | 75.6 | Coil avg.=75.7. |
| | 3 | 77.7 | 74.7 | 3.0 | 76.4 | Max.=77.7. |
| | 4 | 77.0 | 73.2 | 3.8 | 75.7 | Min.=72.9. |
| | 5 | 76.8 | 73.9 | 2.9 | 75.3 | Spread=4.8. |
| | 6 | 76.8 | 73.6 | 3.2 | 75.8 | |
| 2 | 1 | 76.5 | 73.0 | 3.5 | 74.9 | |
| | 2 | 77.0 | 73.4 | 3.6 | 76.0 | Coil avg.=75.5. |
| | 3 | 77.0 | 73.9 | 3.1 | 75.9 | Max.=77.0. |
| | 4 | 76.0 | 73.7 | 2.3 | 75.1 | Min.=72.9. |
| | 5 | 76.3 | 73.8 | 2.5 | 75.5 | Spread=4.1. |
| | 6 | 76.5 | 72.9 | 3.6 | 75.4 | |
| 3 | 1 | 77.1 | 74.3 | 2.8 | 75.7 | |
| | 2 | 77.6 | 73.7 | 3.9 | 76.2 | Coil avg.=75.7. |
| | 3 | 77.4 | 74.3 | 3.1 | 76.0 | Max.=77.6. |
| | 4 | 76.8 | 73.7 | 3.1 | 75.4 | Min.=73.5. |
| | 5 | 76.8 | 73.7 | 3.1 | 75.7 | Spread=4.1. |
| | 6 | 77.1 | 73.5 | 3.6 | 75.4 | |

It will be seen that Coil No. 3 of Cast No. 1 gave results that were consistently 1 t.s.i. higher than the other two coils of the cast. It is probable that there was no true difference, but rather that the explanation lies in the method of calculating the cross-sectional area of the test pieces, which in Cast No. 1 was based on the average diameter, determined from the mean of the maximum and minimum diameters of the cross-section. All the other cross-sectional areas were calculated from the density and weight of a known length, which is a more accurate method.

Apart from uniformity within individual coils, the uniformity within the coils of a group is also good as the following indicates:

TABLE 5

| Carbon | Max. variation in ring, tons. f. in.$^{-2}$ | Max. variation in coil, tons. f. in.$^{-2}$ | Max variation in cast, tons. f. in.$^{-2}$ |
|---|---|---|---|
| .51 | 3.4 | 4.1 | 5.1 |
| .68 | 3.8 | 4.0 | 4.1 |
| .83 | 4.3 | 4.8 | 4.8 |

Each ring showed two tensile strength minima, corresponding to the edges of the rod mat on the conveyor. In wire-drawing to usual specifications it is the difference between these minima and the average tensile strength of the coil or group of coils which determines the suitability of the rod for finished wire production. The high quality of the product of the invention in this respect is shown by the following:

TABLE 6

| Carbon | Individual coil average, tons. f. in.$^{-2}$ | 3-coil group, average, tons. f. in.$^{-2}$ | Variation of lowest min. from average | |
|---|---|---|---|---|
| | | | Coils, tons. f. in.$^{-2}$ | Group, tons. f. in.$^{-2}$ |
| .51 | 53.2 / 53.3 / 54.3 | 53.6 | −2.4 | −2.7 |
| .68 | 64.5 / 64.5 / 64.6 | 64.5 | −2.6 | −2.6 |
| .83 | 75.7 / 75.5 / 75.7 | 75.6 | −2.8 | −2.7 |

As a final example, details will be given of the production of rods from three casts of different carbon contents and the drawing of these rods into wire.

The analyses of the three casts, each of 5 tons, were as follows:

TABLE 7.—PERCENT COMPOSITION

| Cast No. | C | Si | S | P | Mn | Ni | Cr | Sn | Cu | Mo |
|---|---|---|---|---|---|---|---|---|---|---|
| 4 | 0.47 | 0.22 | 0.028 | 0.008 | 0.70 | 0.08 | 0.06 | 0.005 | 0.05 | 0.01 |
| 5 | 0.58 | 0.22 | 0.023 | 0.011 | 0.55 | 0.06 | 0.08 | 0.011 | 0.07 | 0.01 |
| 6 | 0.74 | 0.22 | 0.011 | 0.010 | 0.60 | 0.07 | 0.07 | 0.011 | 0.08 | 0.01 |

The details of the reeling and cooling of all casts are as follows:

Overall time from the last mill stand 1 to the entrance of the tunnel 9 __________ 12.1 to 12.3 seconds.
Time from the reeler 4 to the entrance of the tunnel 9 ________ 10.2 to 10.4 seconds.
Time in the tunnel 9 ___________ 39.8 seconds.
Speed in the tunnel ____________ 91.3 ft./min.
Spacing of loops ______________ Average 2½ inches.
Temperature in ° C.

| Cast | 4 | 5 | 6 |
|---|---|---|---|
| Last stand | 995, 1000, 975, 980 | 995, 995, 985, 990 | 995, 990, 990, 980 |
| Leaving reel | 985, 990, 965, 975 | 985, 985, 975, 980 | 985, 980, 980, 975 |
| Entering tunnel | 880, 870, 870, 860 | 875, 875, 870, 870 | 865, 975, 870, 865 |

The rolling of these casts produced rods as follows:

TABLE 8.—CONTROLLED COOLED RODS

| Material | | | |
|---|---|---|---|
| Cast | 4 | 5 | 6 |
| No. of coils | 10 | 10 | 10 |
| Average coil wt., cwts | 9.28 | 9.94 | 9.60 |
| Average scale wt., percent | 1.31 | 1.05 | 0.82 |

Tensile tests on specimens from each coil gave the following results:

TABLE 9

| | Tensile strength, tons. f. in.$^{-2}$ | | |
|---|---|---|---|
| Cast number | 4 | 5 | 6 |
| Carbon, percent | 0.47 | 0.58 | 0.74 |
| Coil number: | | | |
| 1 | 49 | 61 | 66 |
| 2 | 50 | 58 | 69 |
| 3 | 51 | 60 | 70 |
| 4 | 50 | 60 | 66 |
| 5 | 51 | 58 | 71 |
| 6 | 48 | 59 | 69 |
| 7 | 50 | 57 | 71 |
| 8 | 52 | 59 | 72 |
| 9 | 52 | 57 | 70 |
| 10 | 50 | 60 | 70 |
| 11 | 49 | 61 | 72 |
| 12 | 49 | 58 | 71 |
| Average | 50 | 59 | 70 |

The coils were drawn to wire as shown by Table 10 below:

The possibility of drawing rods to 16 gauge wire with none or a minimum number of breaks and without detri-

TABLE 10

Cast 4—0.47% C

| Coil number | 1 | 2 | 3 | 4 | 5 | 6 | 7 | 8 | 9 | 10 |
|---|---|---|---|---|---|---|---|---|---|---|
| Rod size (mm.): | | | | | | | | | | |
| Min | 5.64 | 5.53 | 5.72 | 5.57 | 5.71 | 5.50 | 5.66 | 5.56 | 5.71 | 5.73 |
| Max | 5.91 | 5.86 | 5.92 | 5.87 | 5.92 | 5.91 | 5.92 | 5.85 | 6.01 | 5.94 |
| Drawing speed (ft./min.) | 1,600 | 1,600 | 1,600 | 1,600 | 1,600 | 1,600 | 1,100 | 1,100 | 1,100 | 1,100 |
| Wire size (mm.) | 1.64 | 1.64 | 1.64 | 1.65 | 1.64 | 1.65 | 1.625 | 1.63 | 1.62 | 1.625 |
| No. of breaks | None | None | None | None | None | None | None | None | None | None |

Cast 5—0.58% C

| Coil number | 1 | 2 | 3 | 4 | 5 | 6 | 7 | 8 | 9 | 10 |
|---|---|---|---|---|---|---|---|---|---|---|
| Rod size (mm.): | | | | | | | | | | |
| Min | 5.62 | 5.47 | 5.57 | 5.55 | 5.75 | 5.65 | 5.70 | 5.61 | 5.69 | 5.62 |
| Max | 5.91 | 5.85 | 5.90 | 5.86 | 6.02 | 5.85 | 5.92 | 5.90 | 5.91 | 5.92 |
| Drawing speed (ft./min.) | 1,400 | 1,400 | 1,400 | 1,400 | 1,100 | 1,100 | 1,100 | 1,100 | 1,100 | 1,100 |
| Wire size (mm.) | 1.65 | 1.65 | 1.655 | 1.65 | 1.64 | 1.63 | 1.63 | 1.63 | 1.63 | 1.63 |
| No. of breaks | None | None | None | None | None | None | None | None | None | None |

Cast 6—0.74% C

| Coil number | 1 | 2 | 3 | 4 | 5 | 6 | 7 | 8 | 9 | 10 |
|---|---|---|---|---|---|---|---|---|---|---|
| Rod size (mm.): | | | | | | | | | | |
| Min | 5.53 | 5.60 | 5.50 | 5.60 | 5.56 | 5.57 | 5.55 | 5.74 | 5.68 | 5.63 |
| Max | 5.91 | 5.88 | 5.86 | 5.88 | 5.87 | 5.90 | 5.91 | 5.95 | 6.04 | 5.90 |
| Drawing speed (ft./min.) | 1,450 | 1,450 | 1,250 | 1,250 | 1,250 | 1,250 | 1,250 | 1,100 | 1,100 | 1,100 |
| Wire size (mm.) | 1.66 | 1.66 | 1.64 | 1.63 | 1.64 | 1.63 | 1.64 | 1.62 | 1.62 | 1.625 |
| No. of breaks | 1 | 1 | 1 | 1 | None | None | None | None | None | 1 |

The prior austenite grain size, determined by the ferrite network outlining the grains, was estimated as follows:

0.47, C. Cast No. A.S.T.M. 5 to 4.
0.58, C. Cast No. 5. A.S.T.M. 4.

Figure 12:
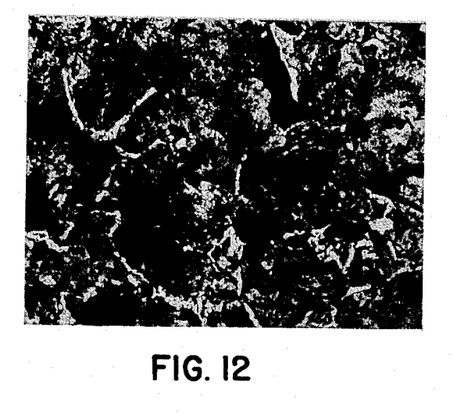
FIG. 12 is a photomicrograph of the microstructure of another rod rolled according to the invention.

A typical photomicrograph of the 0.58% carbon cast No. 5 is shown in FIG. 12.

Tests on specimens of the resultant wires gave the following results:

ment to the properties is a very considerable advantage, as it frequently enables a step of reheating the wire to be eliminated.

Another advantage of the invention is saving in the capital cost of the plant required to carry out the process, since the normal water-cooling equipment is not required; the fans can be smaller than those needed hitherto for cooling rod in the form of non-concentric rings; and there is no need for complicated equipment for the direction of

TABLE 11

| | Cast 4—0.47% C | | | Cast 5—0.58% C | | | Cast 6—0.74% C | | |
|---|---|---|---|---|---|---|---|---|---|
| Coil number | U.T.S., tons. f. in.$^{-2}$ | Torsion, 100×D | Bends, 5 mm. | U.T.S., tons. f. in.$^{-2}$ | Torsion, 100×D | Bends, 5 mm. | U.T.S., tons. f. in.$^{-2}$ | Torsion, 100×D | Bends, 5 mm. |
| 1 | 105 | 35 | 12 | 121 | 35 | 13 | 140 | 32 | 12 |
| 2 | 106 | 30 | 14 | 118 | 38 | 14 | 131 | 35 | 13 |
| 3 | 105 | 38 | 14 | 123 | 35 | 13 | 138 | 28 | 13 |
| 4 | 105 | 34 | 14 | 120 | 36 | 14 | 130 | 33 | 14 |
| 5 | 108 | 37 | 12 | 111 | 34 | 12 | 136 | 31 | 11 |
| 6 | 105 | 37 | 14 | 116 | 40 | 14 | 130 | 34 | 11 |
| 7 | 103 | 38 | 13 | 112 | 36 | 12 | 127 | 37 | 14 |
| 8 | 104 | 36 | 15 | 120 | 37 | 15 | 136 | 35 | 11 |
| 9 | 105 | 37 | 13 | 111 | 38 | 13 | 138 | 27 | 9 |
| 10 | 104 | 37 | 13 | 119 | 38 | 11 | 132 | 34 | 11 |
| Average | 105 | 36 | 13 | 117 | 37 | 13 | 134 | 33 | 12 |

Figure 13:
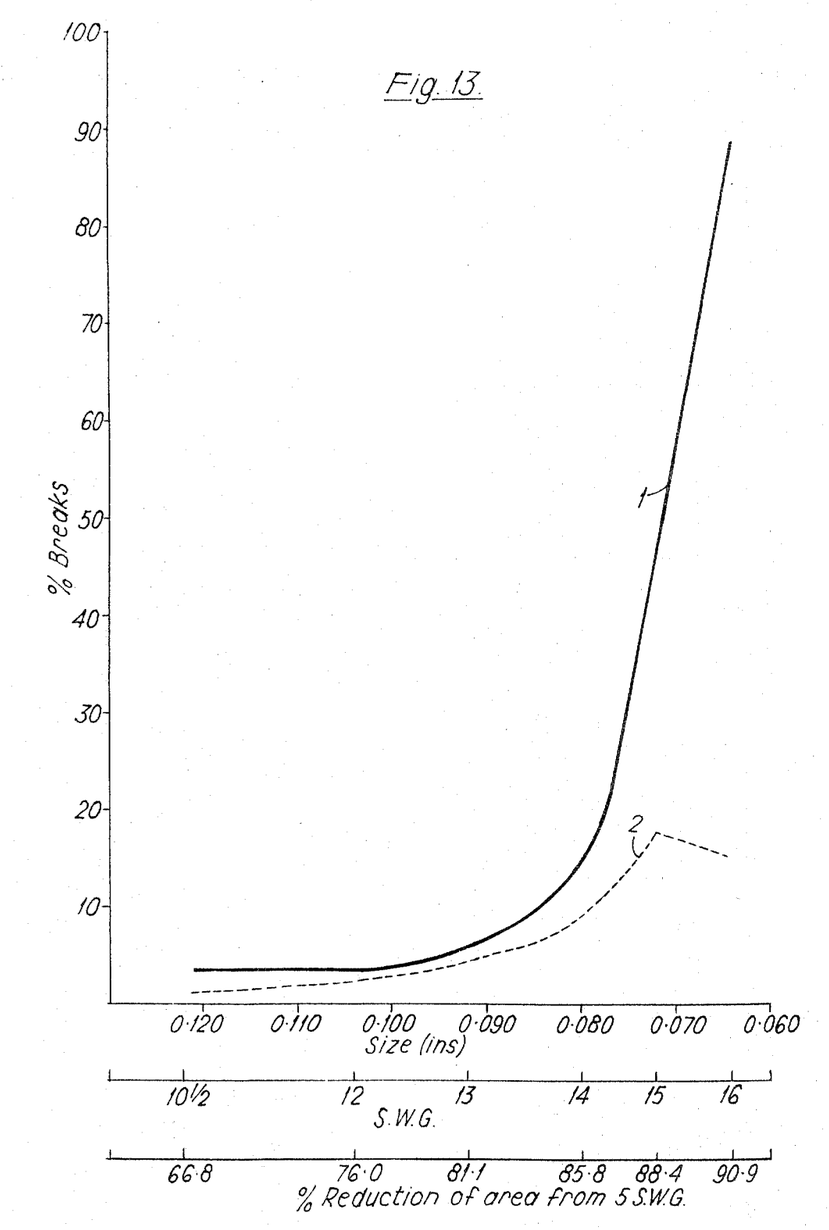
FIG. 13 is a graph illustrating the improvement in wire-drawing properties produced by the invention.

The reduction in the number of breaks during the drawing of rod to wire that is produced by means of the invention is illustrated in FIG. 13, which is a graph showing the percentage of breaks plotted against the diameter of the wire drawn from numerous coils of 5 S.W.G. rod in the periods from Nov. 10, 1966 to Mar. 4, 1967, in which the rods were water-cooled before reeling, and from Sept. 18, 1967 to Nov. 2, 1967, in which the rods were produced according to the invention. The curve marked 1 refers to the water-cooled rods and that marked 2 to the rods produced according to the invention.

coolant in different quantities to different parts of the lateral cross-section of the conveyor.

A still further advantage is the reduction of running costs brought about by the elimination of water cooling and the use of the smaller fans.

Yet another advantage is the improvement in yield brought about by the fact that all parts of the rod are cooled in a similar manner and therefore have similar properties. This is in contrast to the product of processes which involve water cooling before reeling, since there are great practical difficulties involved in passing a rod at high speed through a tube containing flowing water. In view of this it is frequently the practice to shut the water off until the rod has reached the reeler. There is, therefore, an appreciable amount at the front end of the rod which is cooled in a different manner to the bulk of the rod and which, therefore, has different properties and is frequently cut off and discarded. In this invention such a practice is quite unnecessary.

We claim:
1. A process of treating steel rod travelling from a rod mill comprising:
 (a) enlarging the size of the austenite grains in said rod by permitting said rod to cool naturally during the travelling of said rod from said mill, the forming of said rod into overlapping non-concentric rings at a temperature of at least as high as 950° C. on a conveyor, and the conveying of said rings forward;
 (b) after said natural cooling but before the transformation of austenite begins, the average diameter of the grains of said austenite being greater than that represented by the number 5 on the ASTM scale, and, while still conveying the overlapping rings, cooling said rings by the application of forced cooling according to the following sequential pattern over the range of 750° C. to 500° C.;
  (i) at a rate in excess of 1000° C. per minute in the temperature range where austenite rejects ferrite, whereby the amount of grain-boundary ferrite formed is reduced because of the enlarged austenite grains, and
  (ii) at a rate in excess of 700° C. per minute in the temperature range in which fine pearlite is formed, whereby more uniform and finer pearlite is obtained since the transformation to pearlite starts at a lower temperature because the transformation is delayed as a result of the enlargement of the austenite grains.
2. The process of claim 1 wherein the rings are permitted to cool for at least 12 seconds before the positive application of a cooling medium.
3. The process of claim 1, wherein the average forced cooling rate is at least 800° C. per minute over steps (b)(i) and (b)(ii).
4. The process of claim 1 wherein the rate of cooling in step (ii) is lower than the rate of cooling in step (i).
5. The process of claim 1 wherein the forced cooling is by applying air to the rings just before the transformation of the austenite begins.
6. The process of claim 5 wherein the air is applied substantially uniformly over the width of the rings.
7. The process of claim 5 wherein the air is applied by a plurality of fans in line, the first delivering air to cool the rod at a rate of at least 1000° C. per minute.
8. The process of claim 1, applied to hypoeutectoid steel, wherein the rate of cooling in the temperature range in which ferrite is rejected is greater than that in the temperature range in which fine pearlite is formed.
9. The process of claim 1, applied to hypereutectoid steel, wherein the rate of cooling in the temperature range in which cementite is rejected is greater than that in the temperature range in which fine pearlite is formed.
10. The process of claim 1 wherein the conveying speed of the rings is so correlated with that of the rod before its formation into rings that the mat of rings is no more than three rings high at any point.
11. The process of claim 10 wherein the rings are from 44 to 48 inches in diameter and the average spacing of their centers is at least 2½ inches.

References Cited
UNITED STATES PATENTS

| | | | |
|---|---|---|---|
| 3,645,805 | 2/1972 | Hoffman | 148—156 |
| 3,276,920 | 10/1966 | Sims | 148—14 |
| 3,231,432 | 1/1966 | McLean | 148—12 |
| 3,445,100 | 5/1969 | Bond | 148—156 X |

FOREIGN PATENTS

| | | | |
|---|---|---|---|
| 1,577,579 | 6/1969 | France | 148—14 |

CHARLES N. LOVELL, Primary Examiner

U.S. Cl. X.R.
148—12, 134